Jan. 1, 1963    F. KUHRT ET AL    3,071,654
TRANSDUCER FOR MAGNETIC RECORDINGS
Filed Sept. 23, 1959    2 Sheets-Sheet 1

United States Patent Office 3,071,654
Patented Jan. 1, 1963

3,071,654
TRANSDUCER FOR MAGNETIC RECORDINGS
Friedrich Kuhrt, Walter Engel, and Christian-Friedrich Wolf, Nurnberg, Germany, assignors to Siemens-Schuckertwerke Aktiengesellschaft, Berlin, Germany, a corporation of Germany
Filed Sept. 23, 1959, Ser. No. 841,719
Claims priority, application Germany Sept. 25, 1958
6 Claims. (Cl. 179—100.2)

Our invention relates to transducer devices for response to magnetic recordings on tape, wire or other magnetizable carriers. In a more particular aspect, our invention concerns magnetically responsive sensing devices of variable sensing speed for time-contracting or time-expanding (frequency-modifying) reproduction of the recorded signals.

It is known to obtain an accelerated or decelerated reproduction of magnetic signals in tape or wire recorders by providing them with a rotatable transducer head and driving it, for example through a differential gearing from the tape feed drive, in such a manner that the travel speed of the tape past the effective air gap of the transducer head remains invariable, whereas the absolute travel speed of the tape can be varied at will. The same sensing principle is also applicable to magnetic wires or any other magnetic-signal carriers.

In the known magnetic recorders with a rotating transducer head, this head is composed of a number of component sensing heads which are displaced from one another a given angular amount. For example, a known device of this type comprises four individual sensing heads which jointly form a cylinder that possesses four air gaps displaced 90° from each other.

For obtaining a satisfactory reproduction not appreciably affected by the rotation of the composite transducer assembly, the magnetic signal carrier must surround the transducer assembly along one quarter of a full cycle. As a result, during rotation of the head assembly, a new air gap commences the sensing operation as soon as the previously effective gap passes out of the action range of the travelling tape.

The known rotating transducer heads described above operate on the induction principle. That is, they have induction windings in which electric voltages are induced by the magnetic signals passing by the air gap. This requires a relatively large minimum size of the individual component transducers, which leads to a disagreeably large over-all size of the rotating assembly comprising a multiplicity of such individual heads.

It is an object of our invention to devise a more favorable type of rotatable transducer head for the above-mentioned purposes that can be given smaller over-all dimensions while securing or improving the desired electric properties of the transducer assembly when sensing and reproducing the magnetic signals.

To this end, and in accordance with our invention, we provide a rotating transducer head with one or more Hall-voltage generators which are located in one field gap, or in a corresponding number of gaps, of a magnetizable system, and which rotate together with the transducer head as a component thereof.

It has already been proposed, in principle, to use Hall-voltage generators as pickups for the reproduction of magnetic recordings. One of these transducers comprises a combination of an inductive sensing system with a Hall generator, and is described and illustrated in the copending application of Friedrich Kuhrt and Walter Engel, Serial No. 812,922, filed May 13, 1959, now abandoned, for Transducer for Magnetic Recordings, assigned to the assignee of the present invention. The combined inductive and Hall-voltage generating transducer, while applicable for the reproduction of recorded sound, does not rotate during the sensing operation and hence does not afford a frequency-modifying operation. It should be understood, however, that a combined inductive and Hall-voltage generating sensing head may also be used for the purposes of our invention, provided the sensing head is made rotatable and designed for operation as more fully described hereinafter.

It has further been proposed to provide a sensing head for magnetic recordings with a Hall-voltage generating plate and to mount this plate directly in the active air gap of the head facing the magnetic-signal carrier. Such a device is described and shown in the copending application of Friedrich Kuhrt, Serial No. 812,915, filed May 13, 1959, now Patent No. 3,041,416, for Transducer System for Magnetic Signals, assigned to the assignee of the present invention. This device, too, is a stationary transducer unsuitable for frequency-modifying operations.

In comparison with the use of purely inductive sensing heads in rotatable transducers for time-contracting or time-expanding reproduction, a device according to the invention has the advantage that by virtue of using Hall-voltage generators, a considerably greater number of sensing gaps can be accommodated on a given periphery of the transducer disc, drum, or other rotatable body. On the other hand, in cases where the number of the sensing gaps is not to be increased, the invention also affords reducing the over-all size of the transducer assembly. Thus, when using only a single sensing head, a transducer head of extremely slight diameter, for example approximately 1 to 2 mm. can be obtained. In this manner, a greater amount of frequency contraction or expansion for a given quality of reproduction can be obtained or, conversely, an improved reproduction quality is afforded for a given amount of contraction or expansion. The invention is of particularly outstanding importance for slow travel speeds of the magnetic tape or other signal carrier, in contrast to the previously available sensing heads which, on account of their relatively large size, are applicable, as a rule, only for relatively high speed of the recording tape.

The invention will be further described with reference to the drawings showing embodiments of rotatable transducers according to the invention by way of example.

Figure 1:
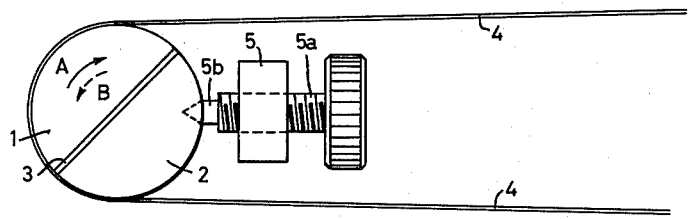
FIG. 1 is a top view of a rotatable transducer with a single air gap.
Figure 2:
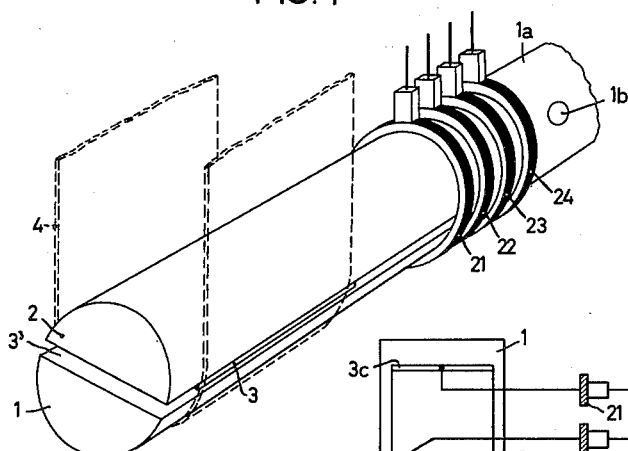
FIG. 2 is a schematic perspective view of the same transducer.
Figure 3:
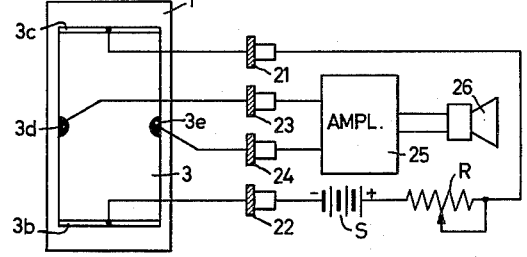
FIG. 3 is an example of an electric circuit diagram applicable for the transducer of FIGS. 1 and 2.

The rotatable transducer head according to FIGS. 1, 2 and 3 has only one active gap. It is composed of two semi-circular bodies 1 and 2 of magnetizable material, preferably ferrite. The gap 3' formed between the two magnetizable bodies is substantially filled by a semiconducting Hall plate 3 consisting of a semiconducting coating on one of the magnetizable bodies. The two bodies 1 and 2 preferably consist of the slitted portion of a cylindrical pin whose remaining portion 1a is massive, i.e. not slitted.

The Hall plate is provided with two current supply electrodes 3b and 3c (FIG. 3) and with two probe electrodes 3d and 3e. The magnetic recording tape 4 is so guided that it surrounds one-half of the periphery of the cylindrical system. When the field of a magnetic signal acts upon the Hall plate 3, a corresponding Hall voltage is generated between the probe electrodes 3d and 3e, provided an energizing current is simultaneously passing between the electrodes 3b and 3c. The energizing current is supplied from a suitable source S, preferably through a calibrating rheostat R, by means of slip rings 21, 22 and corresponding brush contacts. The slip rings are mounted on a massive cylindrical portion 1a (FIG. 2) of the above-mentioned magnetizable system. The Hall voltage generated between electrodes 3e and 3d is taken off by means of two slip rings and brushes denoted by 23, 24 and, upon amplification in an amplifier 25, is applied to a receiving instrument 26 such as a loudspeaker.

With a single-gap design of the type just described, the cylindrical transducer head can readily be given a diameter of approximately 1 mm. Although the transducer head possesses only one effective gap, the recording tape is continuously sensed, namely alternately on one or the other side of the gap 3′ provided the tape 4 engages the cylindrical head surface over substantially 180° during rotation of the head.

The two sides of the air gap can readily be made to have the same dimensions and properties. Since only one Hall plate is necessary, the Hall voltage issuing during rotation of the transducer head is not subjected to variation on account of such rotation. This is an essential advantage over the above-mentioned known rotating transducers with a multiplicity of inductive sensing systems which require special expedience to secure uniformity of all systems, a satisfactory reproduction of the signals being obtained only if such individual sensing systems have all the same reproducing qualities to a great degree of accuracy; otherwise a periodic increase and decrease of the output voltages, or other disturbances, may occur.

The use of a single Hall generator has the further advantage of reducing the number of electric leads that must be connected with the rotating system. As described, only two leads with slip rings 21, 22 are required for the energizing current and only two further leads and slip rings 23, 24 for taking the output voltage off the transducer head.

As mentioned, the magnetic tape surrounds the transducer head over an angle of approximately 180°, which affords a continuous reproduction because, during rotation of the transducer head, one side of the air gap becomes effective at the moment when the recording tape leaves the other side of the gap. However, when arresting the rotatable transducer head, it is in some cases desired to prevent the head from reaching standstill in the just-mentioned position where one gap becomes ineffective and the others commence to be effective. In most cases, the transducer head is stopped mechanically or electro-mechanically. It is therefore readily possible to take care that when the transducer head is being stopped or arrested, and if by chance it tends to stop in the just-mentioned position, it is caused to perform a slight additional motion forward or reverse. In such cases, the recording tape will engage only one side of the sensing gap whenever the transducer head is at standstill.

A simple mechanical arresting device of the just-mentioned type is shown in FIG. 1. Mounted on a stationary block 5 is a screw bolt 5a with a knurled head for manual operation. The screw carries a coaxial tip 5b which is displaceable in a coaxial bore and is spring-biased toward the cylindrical head structure 1a. For stopping the transducer head, the bolt 5a is turned toward the head until the tip 5b resiliently engages the periphery of head portion 1a (FIG. 2) where it snaps into a conical bore 1b, thus stopping the transducer head in the position shown in FIG. 1 where only one side of the gap is adjacent to the tape 4.

During operation of the device, the magnetic tape 4 is driven at constant speed while passing from a supply spool onto a take-up spool. At the same time, the transducer head is also driven to rotate about its own axis. Assuming that the direction of tape travel is indicated by the arrow A in FIG. 1, the transducer head may be driven in the opposite direction, as indicated by the arrow B. However, the transducer head may also be driven to rotate in the same direction as the tape but at greater speed. When the transducer head is not driven, the reproducing operation corresponds to the absolute travel speed of the tape and is effected in the conventional manner. It will be understood that the drive for the transducer rotation is preferably taken from the feeder drive for the tape through a suitable transmission of variable transmission ratio, such as the differential gear means used for similar purposes in the known rotatable transducer assemblies mentioned above.

Figure 4:
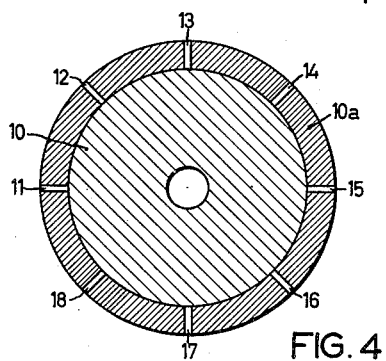
FIG. 4 is a cross section of another transducer head with a multiplicity of sensing gaps.
Figure 6:
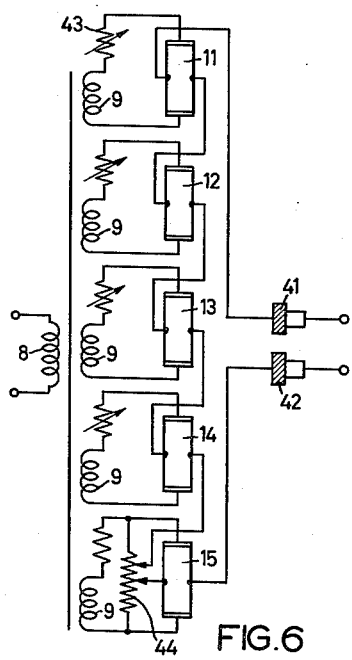
FIG. 6 is a schematic circuit diagram for a transducer of the type shown in FIGS. 4 and 5.
Figure 5:
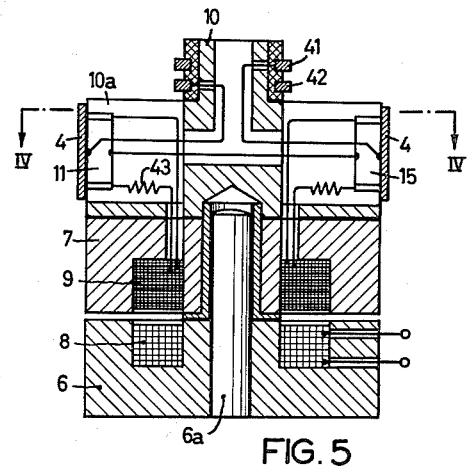
FIG. 5 is an axial section of the transducer according to FIG. 4.

In the embodiment illustrated in FIGS. 4 and 5, in conjunction with circuitry similar to that shown in FIG. 6, the transducer head has a magnetizable system with a multiplicity of sensing gaps and a corresponding multiplicity of Hall plates uniformly distributed over the periphery of the magnetizable sensing disc or drum. Shown in FIG. 4 are eight gaps denoted by 11 to 18 which are machined into a ferromagnetic body 10a of annular shape which may consist of ferrite or the like material. The ring-shaped body 10a is shown rigidly joined with a supporting body 10 preferably of non-magnetic metal. For simplicity, the Hall plates shown in FIGS. 5 and 6 are denoted by the same reference numbers as the gaps according to FIG. 4 in which the respective plates are located. The supply of mutually isolated energizing currents for the Hall plates in this embodiment is effected inductively by means of an alternating voltage having a much higher frequency than that of the signals to be reproduced, for example a frequency of 100 kilocycles per second. The high carrier frequency is supplied by means of the primary winding 8 (FIGS. 5, 6) of a transformer whose secondary windings 9 are individually connected to the current-supply electrodes of the respective Hall plates. The Hall electrodes of all Hall plates are connected in series with each other, as shown in FIG. 6, where only five Hall plates are illustrated instead of the eight shown in FIG. 4. The resulting Hall voltage is taken off by means of only two slip-ring assemblies denoted by 41 and 42 (FIGS. 5, 6). All Hall plates of the assembly are either carefully matched; or, if desired, small calibrating resistors are provided, such as the one denoted in FIG. 6 by 43, in order to obtain proper matching of the individual Hall voltages generated by the respective Hall plates, regardless of any slight manufacturing tolerances with respect to the secondary windings 9 or other circuit components. For securing an accurate frequency response, it is usually necessary to superimpose upon the Hall-electrode circuit of the assembly an auxiliary voltage for providing a defined zero component. For this purpose, the device according to FIG. 6 is shown equipped with a potentiometer 44 connected across one of the secondary transformer windings 9 and having a tapped-off portion connected in series with the Hall-electrode circuit of the assembly.

The above-mentioned transformer for the carrier-frequency current energizing the Hall plate, comprises a lower stationary core portion 6 and an upper rotatable core portion 7. The stationary portion 6 is provided with the primary winding 8. The rotatable portion 7 contains the secondary windings 9, the number of secondary windings being equal to that of the gaps and Hall plates. The upper core portion 7 of the transformer is firmly joined with the body 10 which carries the magnetizable ring structure 10a in which the active gaps and Hall plates are located. The rotatable core portion is mounted on a pivot pin 6a which is firmly secured to the stationary core portion 6 and serves as a bearing for the rotatable transducer and transformer assembly.

Figure 7:
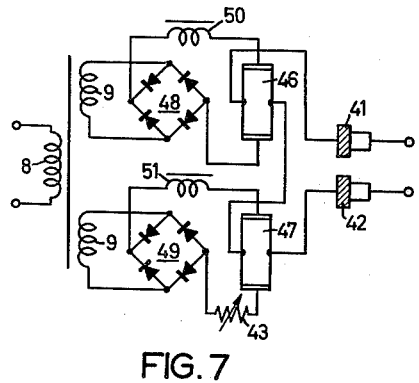

In cases where it is desired to operate with direct current tor energizing the Hall plates, a design similar to that of FIGS. 4 and 5 may be used, and the alternating voltages from respective secondary windings 9 can then be rectified by rectifiers and smoothing components also mounted in the rotatable assembly. An embodiment of this type is schematically illustrated by the circuit diagram shown in FIG. 7. The rectifiers mounted on the rotatable assembly are denoted by 48, 49 and the inductive smoothing coils by 50 and 51 respectively. In all other respects this device may be similar to the one described above with reference to FIGS. 4 and 5.

The embodiments described so far have in common that the respective Hall voltages are connected in series, which requires isolating the respective control-current circuits for energizing the Hall plates. Conversely, however, the energizing circuits may be combined with each other, whereas the Hall voltage output circuits of the respective Hall plates are mutually isolated. In this manner, a parallel or series connection of the individual energizing circuits can be used and, accordingly, each of the Hall-voltage outputs can be supplied to a separate transformer or to a separate primary winding of a common output transformer whose secondary side is connected to the input terminals of the amplifier.

Figure 8:
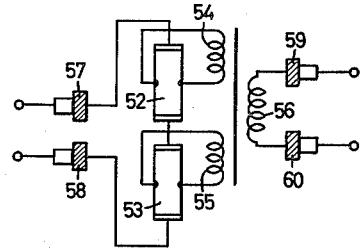
FIGS. 7 and 8 are two respective circuit diagrams of further transducer assemblies designed on the principles of FIGS. 4 and 5.

An embodiment of the type just mentioned is schematically illustrated in FIG. 8. The rotatable assembly in this case comprises the magnetizable structure with gaps in which the Hall plates are located, only two such plates 52, 53 being shown in FIG. 8. The rotatable assembly further comprises a transformer with two primary windings 54, 55 and a single secondary winding 56. Current is supplied to the Hall plates 52 and 53 by means of two slip-ring assemblies 57, 58 to which the two Hall plates are connected in series with each other. The respective pairs of Hall electrodes are connected to the primary windings 54 and 55. The output voltage is taken from the secondary winding 56 of the transformer through respective slip-ring assemblies denoted by 59 and 60.

Since the transformer 54, 55, 56 rotates together with the rotatable transducer head proper, only two connections for the energizing currents and only two connections for supplying the Hall voltage to the amplifier are required. Consequently, only four slip rings are needed as is the case with the single-gap structure of FIGS. 1 to 3, despite the fact that, in a system of the type shown in FIG. 8, any desired greater number of Hall plates may be used. A further reduction in the number of slip rings can be obtained by using the inductive method of supplying energizing current in analogy to the embodiment described above with reference to FIGS. 4 to 6. A slip ring may also be substituted by letting one electric connection extend through the mass (metal structure) of the device.

The following will further explain the performance of devices according to the invention. In order to temporally compress or expand the reproduction of signals magnetically recorded on tape, it is necessary to correspondingly change the absolute travelling speed of the tape in comparison with the speed used when recording the signals. However, for accurately sensing and reproducing the frequencies recorded on the tape, the relative speed between the sensing gap and the tape must not be changed appreciably. For example, when operating a recording tape during reproduction at a speed increased by 1 cm. per second above the recording speed, the transducer head should rotate with a peripheral speed of 1 cm. per second in a direction opposed to that of the tape travel. During reproducing operation as just exemplified, a portion of the tape corresponding to one-half of the head periphery according to FIG. 1 is not sensed off. This has the effect of shortening, for example, a syllable or sound spoken as part of a word. Thus, for example, the long "ee" sound is reduced to a short "el." Conversely, with the tape travel reduced by 1 cm. per second, the portion of the tape corresponding to one-half of the transducer periphery is scanned-off twice. This has the effect of expanding the individual syllable or sound being reproduced so that, in the example here mentioned, the long sound "ee" is expanded to a still longer "eee." The impression of continuity of a spoken text is preserved if approximately ⅛ of a syllable of a word is eliminated, which corresponds to approximately 30 milliseconds, or if, conversely, ⅛ of the time is added to a syllable or sound.

It will be obvious to those skilled in the art, upon a study of this disclosure, that our invention permits of various modifications and hence may be embodied in devices other than particularly illustrated and described herein, without departing from the essential features of our invention and within the scope of the claims annexed hereto.

We claim:

1. A transducer for variable-speed sensing of signals magnetically recorded on a signal carrier, comprising a transducer head of substantially cylindrical shape peripherally engageable by the signal carrier over an arc of about 180°, said head being rotatable about its cylinder axis relative to the carrier and having two portions of substantially semi-circular cross section, said two portions having respective planar surfaces facing each other and forming between each other a single planar gap traversing said head structure diametrically at a location engageable by the carrier, a Hall plate located in said gap and extending substantially across said head, said Hall plate having current supply means for energizing current and output leads for issuing Hall voltage in response to the signals being sensed.

2. In a transducer according to claim 1, said head comprising a cylindrical pin having a diametrical slot over part of its axial length, whereby said slot forms said gap between said two semi-circular portions.

3. A transducer for variable-speed sensing of signals magnetically recorded on a signal carrier, comprising a transducer head of substantially cylindrical shape peripherally engageable by the signal carrier over a predetermined arc, said head being rotatable about its cylinder axis relative to the carrier and having two portions of substantially semi-circular cross section, said two portions having surfaces facing each other and forming between each other at a location engageable by the carrier a single gap traversing said head structure diametrically in any plane transverse to the axis of the head, a Hall plate located in said gap and extending substantially across said head, said Hall plate having current supply means for energizing current and output leads for issuing Hall voltage in response to the signals being sensed.

4. A transducer for variable-speed sensing of signals magnetically recorded on a signal carrier, comprising a transducer head of substantially cylindrical shape peripherally engageable by the signal carrier and rotatable about its cylinder axis relative to the carrier, said head having magnetizable structure forming radial gap means extending inwardly from the cylinder periphery at a location engageable by the carrier, and Hall-plate means located in said gap means and having current supply means for receiving energizing current and output leads for issuing Hall voltage in response to the signals being sensed, a transformer having a stationary core portion with a primary winding and a coaxially rotatable core portion magnetically coupled with said stationary portion with equal coupling in all rotary positions and joined with said head structure to form a single rotatable assembly together therewith, said rotatable core portion having secondary winding means connected with said current supply means to pass energizing current through said Hall plate means.

5. A transducer for variable-speed sensing of signals magnetically recorded on a signal carrier, comprising a transducer head of substantially cylindrical shape peripherally engageable by the signal carrier and rotatable about its cylinder axis relative to the carrier, said head having magnetizable structure forming a plurality of radial gaps uniformly distributed over the periphery and extending inwardly therefrom, Hall plates located in said respective gaps and having current supply means for receiving energizing current and output leads for issuing Hall voltage in response to the signals being sensed, and a pair of output terminals common to said output leads of said plates, a transformer having a stationary core portion with a primary winding and a coaxially rotatable core portion magnetically coupled with said stationary portion with equal coupling in all rotary positions and joined with said head structure to form a single rotatable assembly together therewith, said rotatable core portion having peripherally distributed secondary windings equal in number to that of said Hall plates, each of said secondary windings being connected with the current supply means of one of said respective Hall plates and being isolated from the other secondary windings and Hall plates.

6. A transducer for variable-speed sensing of signals magnetically recorded on a signal carrier, comprising a transducer head of substantially cylindrical shape peripherally engageable by the signal carrier and rotatable about its cylinder axis relative to the carrier, said head having magnetizable structure forming a plurality of radial gaps uniformly distributed over the periphery and extending inwardly therefrom, Hall plates located in said respective gaps and having current supply means for receiving energizing current and output leads for issuing Hall voltage in response to the signals being sensed, and a pair of output terminals common to said output leads of said plates, a transformer having a stationary core portion with a primary winding and a coaxially rotatable core portion magnetically coupled with said stationary portion with equal coupling in all rotary positions and joined with said head structure to form a single rotatable assembly together therewith, said rotatable core portion having peripherally distributed and mutually insulated secondary windings equal in number to that of said Hall plates and individually connected therewith, said output leads of said Hall plates being connected in series with each other.

References Cited in the file of this patent

UNITED STATES PATENTS

| | | |
|---|---|---|
| 739,004 | Jackson | Sept. 15, 1903 |
| 2,352,023 | Schuller | June 20, 1944 |
| 2,606,944 | MacCallum | Aug. 12, 1952 |
| 2,793,253 | Howey | May 21, 1957 |
| 2,831,069 | Snow | Apr. 15, 1958 |
| 2,866,013 | Reis | Dec. 23, 1958 |
| 2,900,451 | Havstad | Aug. 18, 1959 |
| 2,903,521 | Ellison | Sept. 8, 1959 |

FOREIGN PATENTS

| | | |
|---|---|---|
| 760,874 | Great Britain | Nov. 7, 1956 |